(12) United States Patent
Azem

(10) Patent No.: US 10,605,888 B1
(45) Date of Patent: Mar. 31, 2020

(54) SELECTING OPTIMAL DIRECTIONAL ANTENNA ORIENTATION

(71) Applicant: Sprint Communications Company L.P., Overland Park, KS (US)

(72) Inventor: Khaled Azem, Sterling, VA (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

(21) Appl. No.: 16/419,312

(22) Filed: May 22, 2019

Related U.S. Application Data

(63) Continuation of application No. 15/092,733, filed on Apr. 7, 2016.

(51) Int. Cl.
| | |
|---|---|
| *G01S 3/16* | (2006.01) |
| *G01S 3/38* | (2006.01) |
| *G01S 3/02* | (2006.01) |
| *H04W 52/36* | (2009.01) |
| *H04W 52/14* | (2009.01) |
| *H04W 52/24* | (2009.01) |
| *H01Q 3/08* | (2006.01) |

(52) U.S. Cl.
CPC .............. *G01S 3/16* (2013.01); *G01S 3/023* (2013.01); *G01S 3/38* (2013.01); *H04W 52/146* (2013.01); *H04W 52/243* (2013.01); *H04W 52/36* (2013.01); *H01Q 3/08* (2013.01)

(58) Field of Classification Search
CPC ... G01S 3/023; G01S 3/16; G01S 3/38; G01S 3/72; H04W 52/243–245; H04W 52/146; H04W 52/36
See application file for complete search history.

(56) References Cited

U.S. PATENT DOCUMENTS

| | | | | |
|---|---|---|---|---|
| 3,205,419 | A  * | 9/1965 | Voigt | G05D 3/127 318/467 |
| 8,265,552 | B2 * | 9/2012 | Kamel | H04B 7/0408 455/25 |
| 8,849,288 | B2 * | 9/2014 | Vilhar | G01R 29/10 455/446 |
| 2012/0062423 | A1* | 3/2012 | Lo | H01Q 1/2258 342/374 |
| 2015/0249940 | A1* | 9/2015 | Yang | H04W 36/04 455/436 |

* cited by examiner

*Primary Examiner* — Cassi J Galt

(57) ABSTRACT

A device, method, and computer-readable medium are provided for determining an optimal orientation for a directional antenna in a wireless communications system. Instructions are provided to position a directional antenna in each of a plurality of potential orientations. At each of the potential orientations, a serving node signal power level and a non-serving node signal power level is ascertained, and compared to predefined thresholds. An optimal orientation is selected based on the performed comparisons, among other things. In essence, the optimal orientation is determined based on received signal characteristics ascertained at each potential orientation.

16 Claims, 7 Drawing Sheets

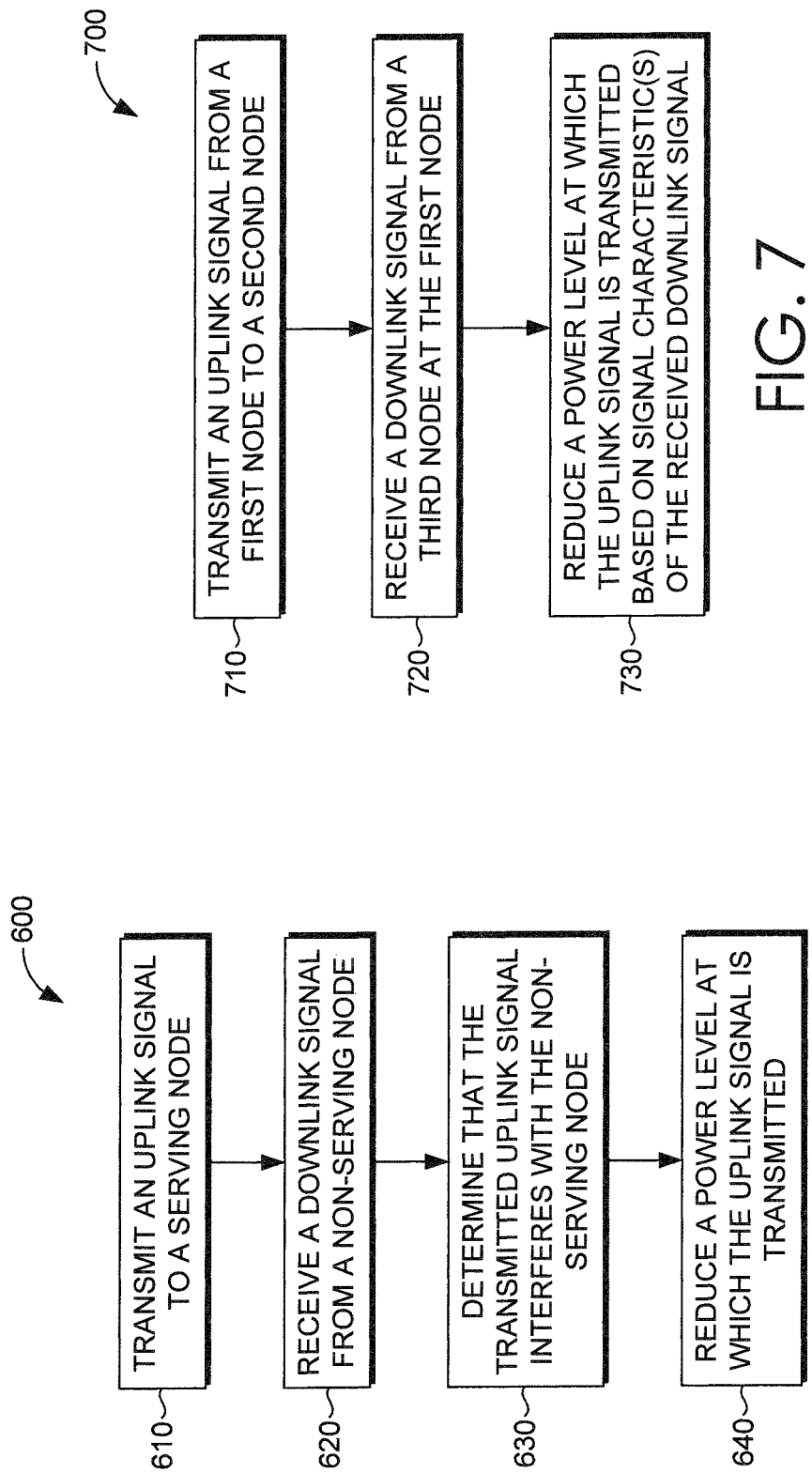

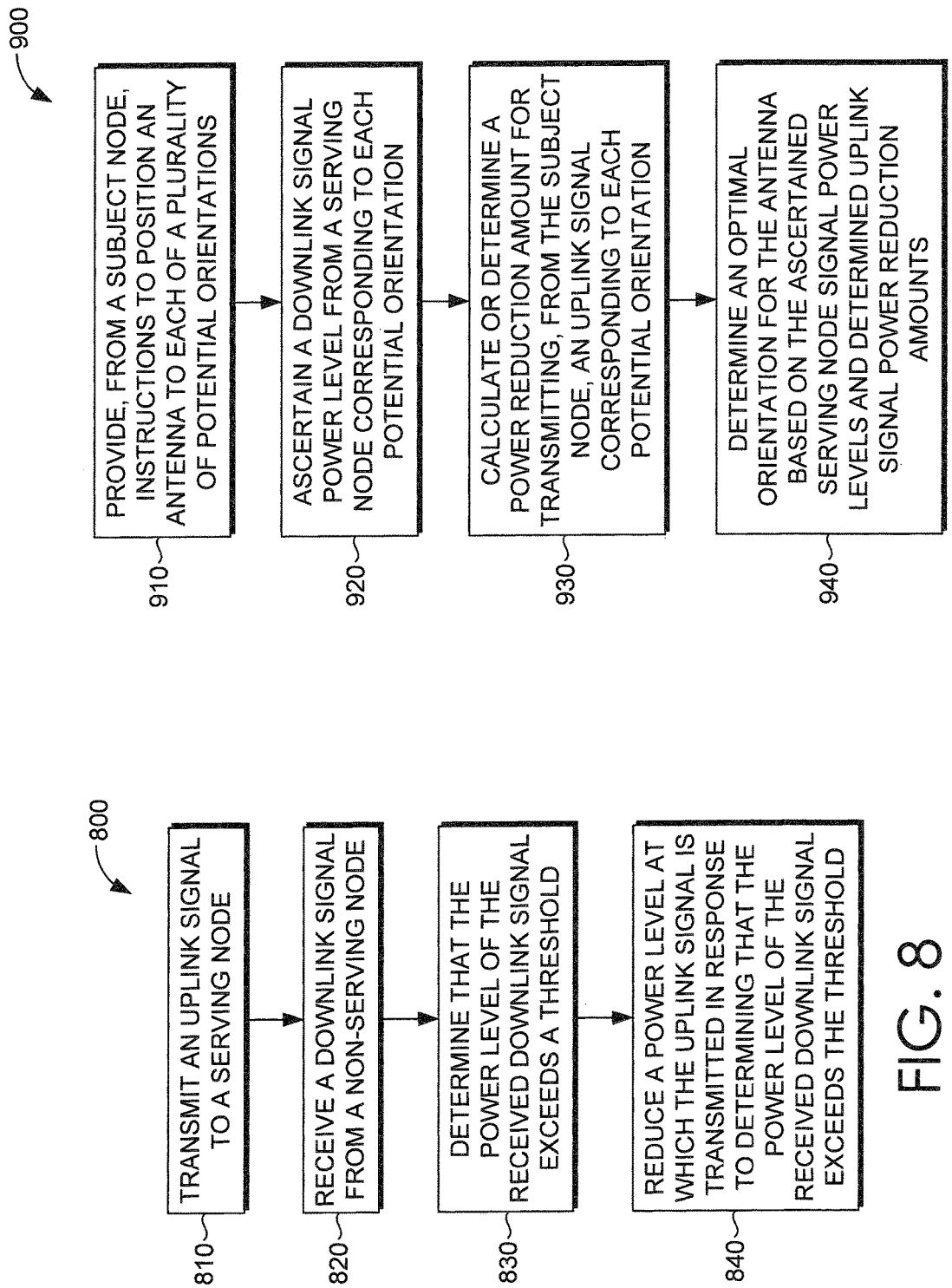

SELECTING OPTIMAL DIRECTIONAL ANTENNA ORIENTATION

CROSS-REFERENCE TO RELATED APPLICATIONS

This application is a continuation of U.S. patent application Ser. No. 15/092,733, filed Apr. 7, 2016, and entitled "Directional Antenna Orientation Optimization." The entirety of the aforementioned application is incorporated by reference herein.

SUMMARY

A high-level overview of various aspects of the invention are provided here for that reason, to provide an overview of the disclosure and to introduce a selection of concepts that are further described below in the detailed-description section below. This summary is not intended to identify key features or essential features of the claimed subject matter, nor is it intended to be used as an aid in isolation to determine the scope of the claimed subject matter.

In brief and at a high level, this disclosure describes methods and systems for limiting undesirable uplink signal interference to non-serving nodes that are adjacent to a serving node. Utilizing some embodiments described herein, an uplink signal transmission that is interfering with non-serving nodes adjacent to a serving node is mitigated by reducing the transmit power of the uplink signal by an amount that is calculated based on ascertained characteristics of downlink signals received from the non-serving nodes. This disclosure also describes, among other things, methods and systems for determining an optimal orientation of a directional antenna by employing in part the described methods and systems for limiting undesirable uplink signal interference to non-serving nodes. Utilizing some embodiments described herein, an optimal antenna orientation is determined based on ascertained downlink signal characteristics and uplink signal interference mitigation efforts at each potential orientation in which the directional antenna can be positioned.

In some embodiments described herein, the amount of uplink signal interference caused to an adjacent non-serving node is reduced based on an ascertained signal power level of a downlink signal received from the adjacent non-serving node. An uplink signal is transmitted from a subject node to a serving node. The uplink signal is transmitted from the subject node at a particular power level. A downlink signal from a non-serving node is received by the subject node. When the downlink signal is received, the subject node ascertains a received signal power level that corresponds to the received non-serving downlink signal. A determination is made that the transmitted uplink signal is creating excessive interference with the non-serving node based on a determination that the received signal power level of the received non-serving node downlink signal exceeds a predefined threshold. In response to determining that the transmitted uplink signal is creating excessive interference with the non-serving node, the power level for transmitting the uplink signal is reduced, thereby reducing the amount of uplink signal interference on the non-serving node.

In other embodiments described herein, an optimal antenna orientation is determined based on ascertained strengths of downlink signals received from potential serving nodes and determined amounts of uplink signal interference caused to non-serving nodes that are adjacent to the potential serving nodes. Instructions are provided to position a directional antenna in various potential orientations. For each one of the potential orientations: a power level is ascertained for the strongest serving node signal received by the directional antenna, and an amount to reduce the transmission power of the uplink signal is calculated (e.g., for interference mitigation). A determination is made that one of the potential orientations is an optimal orientation based on the power levels ascertained for the received potential serving node signals and the calculated amounts for reducing the uplink signal transmission power.

BRIEF DESCRIPTION OF THE SEVERAL VIEWS OF THE DRAWINGS

Illustrative embodiments of the present disclosure are described in detail below with reference to the attached drawing figures, and wherein:

FIGS. 6-8 provide an exemplary method for mitigating uplink signal interference to non-serving nodes, in accordance with some embodiments of the present disclosure; and FIGS. 9-11 provide an exemplary method for determining an optimal antenna orientation, in accordance with further embodiments of the present disclosure.

DETAILED DESCRIPTION

Figure 1:
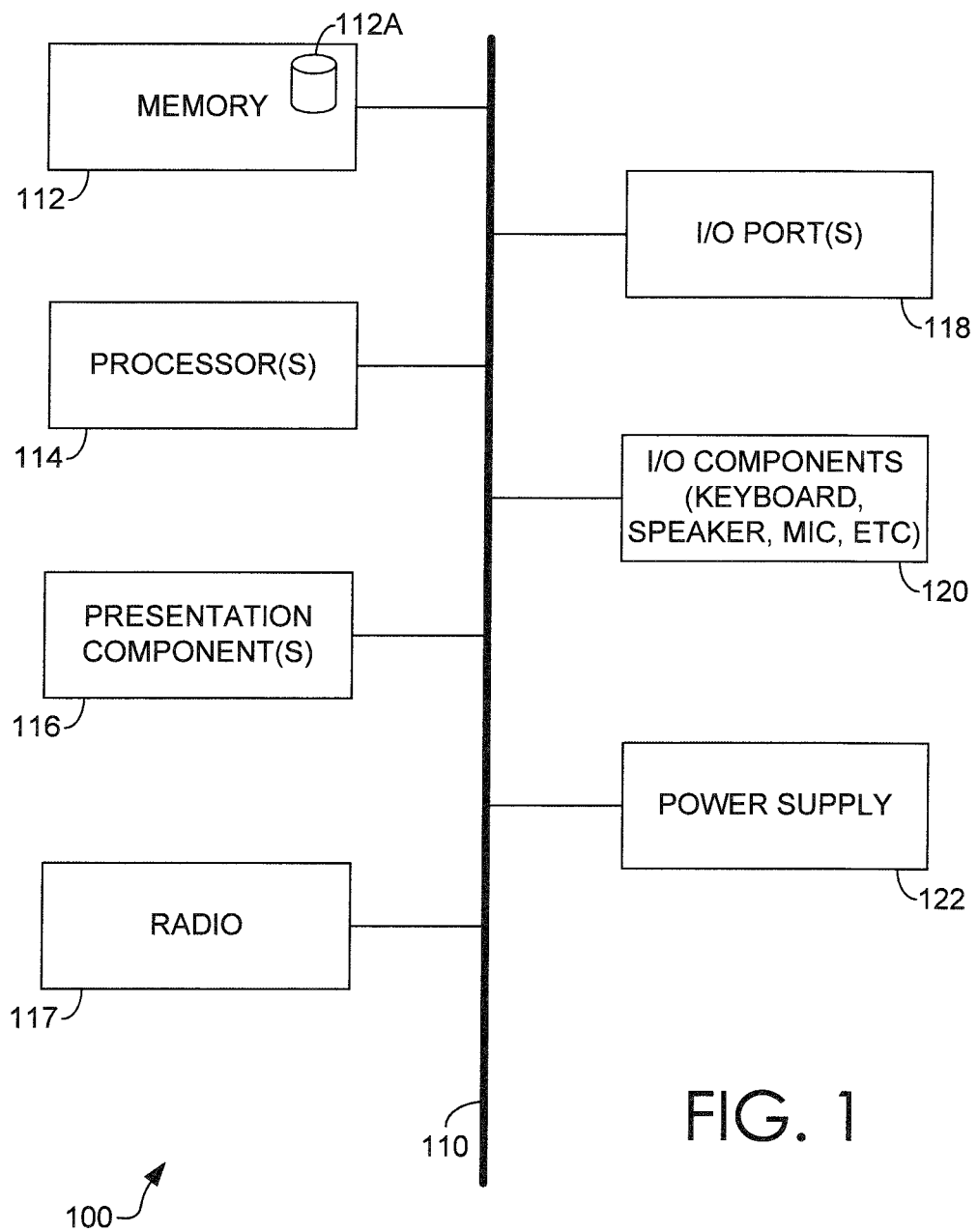
FIG. 1 depicts an exemplary computing device according to implementations of the present disclosure.

The subject matter of select embodiments provided in the present disclosure is described with specificity herein to meet statutory requirements. Nevertheless, the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

| | |
|---|---|
| 3G | Third-Generation Wireless Technology |
| 4G | Fourth-Generation Cellular Communication System |
| CD-ROM | Compact Disk Read Only Memory |

-continued

| | |
|---|---|
| CDMA | Code Division Multiple Access |
| eNodeB | Evolved Node B |
| GIS | Geographic/Geographical/Geospatial Information System |
| GPRS | General Packet Radio Service |
| GSM | Global System for Mobile communications |
| iDEN | Integrated Digital Enhanced Network |
| DVD | Digital Versatile Discs |
| EEPROM | Electrically Erasable Programmable Read Only Memory |
| LED | Light Emitting Diode |
| LTE | Long Term Evolution |
| MD | Mobile Device |
| PC | Personal Computer |
| PCS | Personal Communications Service |
| PDA | Personal Digital Assistant |
| RAM | Random Access Memory |
| RET | Remote Electrical Tilt |
| RF | Radio-Frequency |
| RFI | Radio-Frequency Interference |
| R/N | Relay Node |
| RNR | Reverse Noise Rise |
| ROM | Read Only Memory |
| RSRP | Reference Signal Receive Power |
| RSRQ | Reference Signal Receive Quality |
| RSSI | Received Signal Strength Indicator |
| SINR | Signal-to-Interference-Plus-Noise Ratio |
| SNR | Signal-to-noise ratio |
| SON | Self-Organizing Networks |
| TDMA | Time Division Multiple Access |
| UMTS | Universal Mobile Telecommunications Systems |

Further, various technical terms are used throughout this description. An illustrative resource that fleshes out various aspects of these terms can be found in Newton's Telecom Dictionary, 30th Edition (2016).

Embodiments of our technology may be embodied as, among other things, a device, method, system, or computer-program product. Accordingly, the embodiments may take the form of a hardware embodiment, or an embodiment combining software and hardware. One embodiment described herein takes the form of a computer-program product that includes computer-useable instructions embodied on one or more computer-readable media.

Computer-readable media includes both volatile and non-volatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Referring to the drawings in general, and initially to FIG. 1 in particular, a block diagram of an illustrative computing device according to one embodiment is provided and referenced generally by the numeral 100. Although some components are shown in the singular, they may be plural. For example, communications device 100 might include multiple processors or multiple radios, etc. As illustratively shown, communications device 100 includes a bus 110 that directly or indirectly couples various components together including memory 112, a processor 114, a presentation component 116, a radio 117, input/output ports 118, input/output components 120, and a power supply 122.

Memory 112 might take the form of memory components previously described. Thus, further elaboration will not be provided here, only to say that memory component 112 can include any type of medium that is capable of storing information (e.g., a database). A database can be any collection of records. In one embodiment, memory 112 includes a set of embodied computer-executable instructions that, when executed, facilitate various aspects disclosed herein. These embodied instructions will variously be referred to as "instructions" or an "application" for short.

Processor 114 might actually be multiple processors that receive instructions and process them accordingly. Presentation component 116 includes the likes of a display, a speaker, as well as other components that can present information (such as a lamp (LED), or even lighted keyboards).

Numeral 117 represents a radio(s) that facilitates communication with a wireless-telecommunications network. Illustrative wireless telecommunications technologies include CDMA, GPRS, TDMA, GSM, WiMax, LTE, and the like. In some embodiments, radio 117 might also facilitate other types of wireless communications including Wi-Fi communications and GIS communications. As can be appreciated, in various embodiments, radio 117 can be configured to support multiple technologies and/or multiple radios can be utilized to support a technology or multiple technologies.

Input/output port 118 might take on a variety of forms. Illustrative input/output ports include a USB jack, stereo jack, infrared port, proprietary communications ports, and the like. Input/output components 120 include items such as keyboards, microphones, speakers, touch screens, and any other item usable to directly or indirectly input data into communications device 100. Power supply 122 includes items such as batteries, fuel cells, or any other component that can act as a power source to power communications device 100.

By way of background, radio-frequency interference (RFI) is, in essence, the effect of unwanted energy due to a combination of transmissions received at a receiver (hereinafter also referenced as "radio", which may include both a receiver and transmitter), manifested by any performance degradation, misinterpretation, or loss of information which could be extracted by the receiver in the absence of the unwanted energy. In other words, when a receiver receives transmissions from devices that are not intended for receipt thereby, these "unintended" transmissions may interfere with the receiver's extraction of information from "intended" transmissions for receipt by the receiver, thereby introducing signal noise, degrading service performance, and/or compromising connectivity between the receiver and transmitter.

As quality of a desired signal is proportional to its strength, the gravity of signal interference caused by an interfering signal is also proportional to its strength. In other words, signal strength is proportional to the power (or "gain") employed when transmitting the signal. If the receiver is the intended recipient of a signal, increased signal strength on the transmission end can improve signal quality received on the receiver end. However, if the receiver is not the intended recipient of a signal, increased signal strength on the transmission end can cause increased interference on the receiver end. It can therefore be concluded that decreasing signal strength on the transmission end can cause less interference with a receiver, provided that the receiver is an unintended recipient of the signal.

A wireless communications system, such as a wireless telecommunications system, may include multiple nodes that receive and transmit radio signals in a network. Generally speaking, a node can include any active electronic device that is in communication with the network. Desirable configurations for wireless telecommunications systems minimize interference between radios associated with these nodes. Nodes, which can include base transceiver stations (BTS) or Evolved Node Bs (eNodeBs) (both hereinafter referenced as base transceiver stations "BTS"), may be positioned in locations where cross-interference between their radios is minimized.

Generally speaking, base transceiver stations in wireless telecommunications systems have radios coupled to a set of directional antennas configured for collectively transmitting signals in multiple directions to serve a corresponding coverage area. More specifically, BTS sector antennas comprise of three 120-degree beam angle directional antennas that collectively cover a 360-degree coverage area around the BTS. Each sector antenna has its own sector ID and handover relations, that can handover a subject node to other sectors in the same or another BTS. When a subject node, such as a mobile phone, communicates with a particular BTS (or a particular sector antenna therein), the subject node is most likely being serviced by the particular BTS (and a particular sector antenna thereof) because of its location within the corresponding sector, proximity to the BTS, and/or strength of signal received by the BTS, among other things. When the subject node passes from the sector corresponding to the particular BTS into another sector that corresponds to the same or an adjacent BTS, the subject node is involved in a "hand-off" operation, which coordinates the transfer of communication between the subject node and particular BTS to that of the subject node and adjacent BTS (or in some instances, the same BTS but different sector antenna signal). More importantly, the serving BTS and adjacent BTS are positioned in locations that are close enough to facilitate a handover, but not so close that signals transmitted from each BTS creates significant interference for the other BTS.

In accordance with embodiments described herein, subject nodes can include, among other things, user equipment (UE) and relay nodes (RN). User equipment can include any device used by an end-user to communicate over a wireless telecommunications network. User equipment can include mobile devices, mobile broadband adapters, or any other communications device employed to communicate with the wireless telecommunications network. User equipment, as one of ordinary skill in the art may appreciate, generally include antennas coupled to their radios for transmitting and receiving signals. For instance, smart phones and laptop broadband adapters typically have compact antennas that, in most instances, are omnidirectional.

Relay nodes (RN) are also employed in wireless telecommunications systems, and like user equipment, typically comprise omnidirectional antennas for transmitting and receiving signals. Relay nodes are typically utilized in wireless telecommunications systems to increase network density, extend network coverage, rapidly roll-out new network areas, and/or otherwise improve signal quality of a wireless telecommunications network.

The signal coverage distance of an omnidirectional antenna is proportional to its transmitter power. That is, with omnidirectional signal propagation, the coverage distance is, for the most part, uniformly distributed around the transmitter. In some instances, however, a directional antenna may be employed in lieu of the omnidirectional antenna. Directional antennas generally provide a more directed signal transmission, having a more focused coverage area with greater coverage distance. In this way, a UE or RN employing a directional antenna can communicate with a wireless telecommunications network without being within a coverage area or sector(s) of a serving node, as will be described. Generally speaking, the uplink signal coverage distance and area of a user equipment or relay node employing a directional antenna is based in part on a gain (dBi) level of the directional antenna, a beam width of the directional antenna, and/or a transmission power level associated with the user equipment or relay node.

Mathematically speaking, the coverage distance ratio of the directional antenna to the omnidirectional antenna is equal to 10 raised to the power of (the directional antenna gain divided by 20). To this end, a relay node employing a directional antenna with 0 dBi gain would theoretically have the same coverage distance when employing an omnidirectional antenna, because $10^{(0/20)}=1$. As such, when the relay node employs a directional antenna having a gain that is greater than 0 dBi, it can be concluded that the coverage distance of a directional antenna is greater than the coverage distance of an omnidirectional antenna.

Practically speaking, a user equipment or relay node employing a directional antenna, when compared to its omnidirectional counterpart, may cause excessive interference to nodes that are adjacent to a serving node or within the coverage area of uplink signals transmitted via the directional antenna. In essence, a subject node transmitting uplink signals to a serving node (e.g., an "intended" recipient of the transmitted uplink signal) via directional antenna may cause undesirable interference with one or more non-serving nodes (i.e., an "unintended" recipient of the transmitted uplink signal) that are adjacent to, or in other words positioned within an area near the serving node such that it can receive the subject node uplink signals. More particularly, the subject node's uplink signals, when transmitted via the directional antenna, may propagate a coverage area (e.g., distance and area) that extends beyond what is necessary for maintaining stable communications between the subject node and serving node. If an adjacent non-serving node is within the coverage area of the propagating uplink signal, the uplink signal may cause an undesirable amount of interference with the adjacent non-serving node's receiver. As one of ordinary skill in the art may appreciate, the uplink signal coverage area can be affected by a total output power level at which the uplink signal is transmitted by the subject node, and a beam width associated with the transmitting antenna, among other things. The total output power level can be based on, among other things, a fixed gain level associated with the transmitting antenna and/or an adjustable transmit power level associated with the transmitter of the subject node.

Utilizing embodiments described herein, interference to non-serving nodes adjacent to a serving node, introduced by uplink signal transmissions from a subject node intended for the serving node, can be mitigated by the subject node based on non-serving node signals received by the subject node. In this regard, a subject node can be configured to determine that uplink signals transmitted thereby are causing excessive interference to one or more non-serving nodes based on downlink signals received therefrom. In embodiments, mitigation of the interference can be facilitated by reducing the uplink signal transmit power level on the subject node in response to determining that the transmitted uplink signals are causing excessive interference to one or more non-serving nodes. In further embodiments, the interference can be mitigated with little or no negative impact to signal transmissions between the subject node and the serving node by identifying a power reduction amount based at least in part on characteristics of the non-serving node downlink signal.

Utilizing further embodiments described herein, an optimal orientation for an antenna coupled to a subject node can be determined by the subject node based on signals received thereby. The optimal orientation is, in essence, an orientation at which the subject node's antenna is positioned, where the subject node can receive the strongest serving node downlink signal from a particular serving node while requiring the least amount of interference mitigation for non-serving nodes adjacent to the particular serving node. In embodiments, a sum of a downlink signal power level and an identified power reduction amount for the uplink signal is calculated for association with each potential orientation at which the directional antenna is positioned. The potential orientation having the highest calculated sum associated therewith is determined to be the optimal orientation. More specifically, in one instance, the higher the downlink signal power level, the greater the calculated sum will be. In another instance, the higher the identified power reduction amount, the lower the calculated sum will be. In summary, the downlink signal power level positively impacts the calculated sum, while the power reduction amount negatively impacts the calculated sum. In other embodiments, the downlink signal power and identified power reduction amounts associated with each potential orientation are compared to corresponding thresholds to determine the optimal orientation.

Accordingly, in a first aspect of the present disclosure, an embodiment is directed to a computer-implemented method for mitigating uplink signal interference. The method includes transmitting an uplink signal from a subject node to a serving node. The uplink signal is transmitted from the subject node with a total uplink signal transmit power level. The subject node receives, among other things, a particular non-serving node downlink signal from a particular non-serving node. The particular non-serving node downlink signal received by the subject node has a corresponding received signal power level that is determined by the subject node. The subject node can determine that the transmitted uplink signal is creating excessive interference with the particular non-serving node based on the corresponding received signal power level. In response to determining that the transmitted uplink signal is creating excessive interference with the particular non-serving node, the subject node reduces the total uplink signal transmit power level to mitigate the amount of interference on at least the particular non-serving node caused by the transmitted uplink signal.

In a second of the present disclosure, an embodiment is directed to one or more computer-readable storage media having computer-executable instructions embodied thereon that, when executed, perform a method for mitigating uplink signal interference. The method includes transmitting an uplink signal from a first node to a second node. The uplink signal is transmitted using an uplink signal transmit power level associated with the first node. The second node and at least a third node are located within an uplink signal coverage area that is based in part on the uplink signal transmit power level. In embodiments, the first node can be a subject node, the second node can be a serving node, and the third node can be a non-serving node. The first node receives, among other things, a third node downlink signal from the third node. The received third node downlink signal has at least one signal characteristic that is determined by the first node. The first node reduces the uplink signal transmit power level by an amount that is based at least in part on the third node downlink signal characteristic. The uplink signal coverage area is reduced in response to reducing the uplink signal transmit power level. Reduction of the uplink signal coverage area reduces the amount of interference on at least the third node caused by the transmitted uplink signal.

In a third aspect of the present disclosure, an embodiment is directed to a computerized system that comprises one or more processors and one or more computer storage media storing computer-usable instructions that, when used by the one or more processors, cause the one or more processors to mitigate uplink signal interference. An uplink signal is transmitted from a relay node to a serving node. The uplink signal is transmitted at a total uplink signal transmit power level that is based at least in part on a gain level associated with a directional antenna coupled to the relay node, and further in part on an adjustable uplink signal transmit power level associated with the relay node. The relay node receives, among other things, a particular non-serving node downlink signal from a particular non-serving node. The particular non-serving node downlink signal has a particular non-serving node downlink signal power level that is ascertained by the relay node. The relay node determines that the ascertained particular non-serving node downlink signal power level exceeds a predetermined threshold. In response to determining that the ascertained particular non-serving node downlink signal power level exceeds the predetermined threshold, the relay node reduces the adjustable uplink signal transmit power level, thereby also reducing the total uplink signal transmit power level at which the uplink signal is transmitted. In this regard, the amount of interference on at least the particular non-serving node caused by the transmitted uplink signal is mitigated.

In a fourth aspect of the present disclosure, an embodiment is directed to a computer-implemented method for optimally positioning a directional antenna. Instructions for positioning a directional antenna in each of a plurality of potential orientations are provided. For each of the potential orientations in which the directional antenna is positioned, a corresponding serving node signal power level is ascertained. Also, for each of the potential orientations in which the directional antenna is positioned, a corresponding uplink signal transmit power reduction amount is calculated. A determination is made, selecting one of the plurality of potential orientations as an optimal orientation for positioning the directional antenna. The determination is made based on the ascertained serving node signal power levels and the calculated uplink signal transmit power reduction amounts.

In this way, the optimal orientation for positioning the directional antenna is determined.

In a fifth aspect of the present disclosure, an embodiment is directed to one or more computer-readable storage media having computer-executable instructions embodied thereon that, when executed, perform a method for optimally positioning a directional antenna. Instructions are provided to position a directional antenna in each of a plurality of potential orientations. For each of the potential orientations, a serving node signal power level is ascertained, an uplink signal transmit power reduction amount is calculated, and a sum thereof is calculated, each corresponding to the potential orientation. Based on one of the plurality of potential orientations having a corresponding sum that is a maximum sum, the optimal orientation is determined. In this way, the optimal orientation for positioning the directional antenna is determined, where the corresponding serving node downlink signal at the optimal orientation is maximized, while the need to reduce non-serving node interference at the optimal orientation is minimized.

In a sixth aspect of the present disclosure, an embodiment is directed to a computerized system that comprises one or more processors and one or more computer storage media storing computer-usable instructions that, when used by the one or more processors, cause the one or more processors to optimally position a directional antenna. Instructions are provided to position a directional antenna in each of a plurality of potential orientations. For each potential orientation, a corresponding serving node signal power level and non-serving node signal power level are ascertained, and a corresponding uplink signal transmit power reduction amount is calculated. The corresponding uplink signal transmit power reductions amounts are calculated based on ascertained non-serving node signal power levels corresponding to each of the potential orientations. A determination is made, selecting one of the potential orientations as an optimal orientation. The determination is made based on a comparison of each of the ascertained serving node signal power levels to a serving node power threshold, and another comparison of each of the ascertained non-serving node power levels to a non-serving node signal power threshold.

Figure 2:
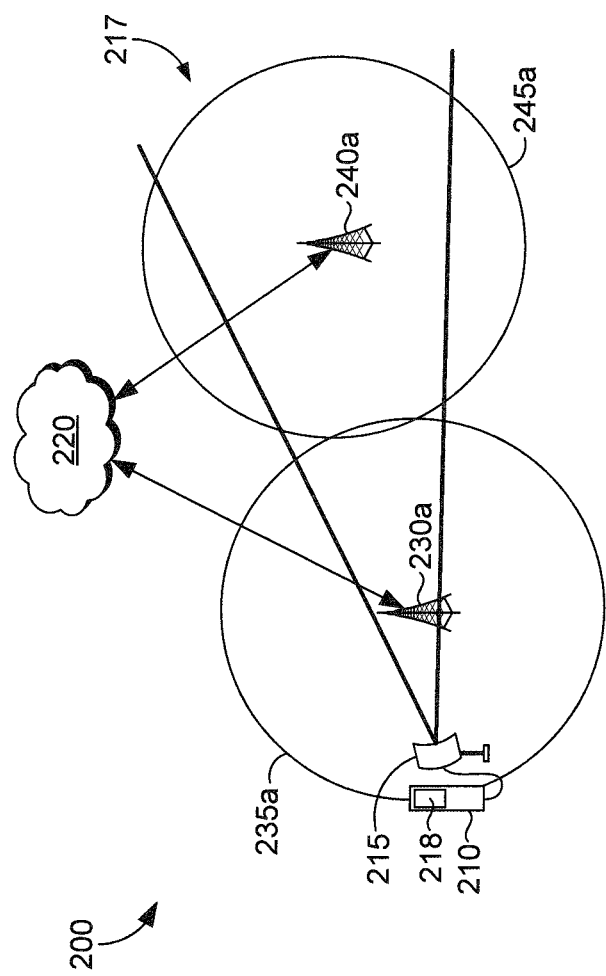
FIG. 2 is a schematic of an exemplary communications environment suitable for use in some embodiments of the present disclosure.

Turning now to FIG. 2, an exemplary network environment suitable for use in implementing embodiments of the present disclosure is illustrated and designated generally as a network environment 200. Network environment 200 is but one example of a suitable network environment and is not intended to suggest any limitations as to the scope of use or functionality of embodiments described herein. Neither should the network environment be interpreted as having any dependency or requirement relating to any one or combination of components illustrated.

In the network environment 200, one or more subject nodes 210 may communicate directly or indirectly with other serving nodes connected to a network 220. Depending on the wireless communication technologies employed by the network environment 200, a serving node might be referred to as or include a base transceiver station (BTS), a radio base station (RBS), a base station (BS), a node B (in 3G networks), or an eNodeB (in LTE network). The subject node 210 may take on a variety of forms, such as a personal computer (PC), a laptop computer, a tablet, a notebook, a mobile phone, a Smart phone, a personal digital assistant (PDA), a relay node (RN), or any other User Equipment (UE) that is capable of wirelessly communicating with the other nodes in the network 200. The subject node 210 may comprise the communications device 100 of FIG. 1, and as such can include, for example, a display(s), a power source(s) (e.g., a battery), a data store(s), a speaker(s), memory, a buffer(s), an antenna, and the like. In embodiments, the subject node 210 comprises a wireless or mobile device with which a wireless-telecommunication-network(s) (e.g., the network environment 200) can be utilized for communication (e.g., voice and/or data communication). In this regard, the subject node 210 can be any User Equipment or Relay Node that communicates by way of, for example, a 3G or 4G network.

In embodiments, the subject node 210 can comprise and/or be coupled to an antenna, such as directional antenna 215. That is, the subject node 210 can employ at least one of an omnidirectional antenna or a directional antenna to communicate with other subject nodes (e.g., User Equipment, etc.) and/or with a serving node 230a (e.g., a BTS or eNodeB). The subject node 210 can utilize the network environment 200 to transmit, via the directional antenna 215, an uplink signal from a transmitter (not shown) of the subject node 210 to an intended recipient, such as serving node 230a. Moreover, the subject node 210 can utilize the network environment 200 to receive, via the directional antenna 215, a downlink signal from a serving node, such as serving node 230a, and in some instances, one or more non-serving nodes, such as non-serving node 240a. Although not shown, it is contemplated that a plurality of non-serving nodes (not shown) can also present in the network environment 200. It is further contemplated that any number in the plurality of non-serving nodes present in the network environment 200 can receive interference from the transmitted uplink signal, and also transmit a downlink signal that is received by the subject node 210.

The subject node 210 can comprise an uplink signal interference mitigation component 218. The uplink signal interference mitigation component 218 can be configured to mitigate uplink signal interference caused by the subject node's transmitted uplink signal. More specifically, the uplink signal interference mitigation component 218 can adjust, based on downlink signals received by the subject node 210, a power level at which the uplink signal is transmitted by the subject node 210 in order to reduce the amount of interference caused by the transmitted uplink signal to unintended recipients of the signal, as will be described in more detail herein. In embodiments, the uplink signal interference mitigation component 218 can calculate a reduction amount for the uplink signal transmission power level, based on the received downlink signals, particularly from adjacent non-serving nodes (e.g., non-serving nodes 240a).

In embodiments, the network 220 is a telecommunications network(s), or a portion thereof. The network environment 200 as illustrated is merely a portion of network 220. A telecommunications network might include an array of devices or components, some of which are not shown so as to not obscure more relevant aspects of the embodiments described herein. Components such as terminals, links, and nodes (as well as other components) can provide connectivity in some embodiments. The network 220 can include multiple networks, as well as being a network of networks, but is shown in more simple form so as to not obscure other aspects of the present disclosure. The network 220 can be part of a telecommunications network that connects subscribers or users to their immediate service provider. In embodiments, the network 220 can be associated with a telecommunications provider that provides services to mobile devices, such as the subject node 210. For example, the network 220 may provide voice and/or data services to mobile devices or corresponding users that are registered to utilize the services provided by a telecommunications provider. The network 220 can be any communication network providing voice and/or data service(s), such as, for example, a 1× circuit voice, a 3G network (e.g., CDMA, CDMA2000, WCDMA, GSM, UMTS), or a 4G network (WiMAX, LTE, HSDPA).

The network environment 200 may include a database (not shown). The database may be similar to the memory component 112A of FIG. 1 and can be any type of medium that is capable of storing information. The database can be any collection of records. In one embodiment, the database includes a set of embodied computer-executable instructions that, when executed, facilitate various aspects disclosed herein. These embodied instructions will variously be referred to as "instructions" or an "application" for short.

Although network environment 200 is illustrated with single components, as can be appreciated, the components are scalable and any number of each of the components may exist in the network environment. Further, although not illustrated herein, additional components or combination of components may exist within the network environment 200. While FIG. 2 is generally described in relation to uplink signal interference mitigation, as can be appreciated, any other subject node-controlled or operated component(s) are also contemplated in accordance with embodiments described herein.

In one embodiment, the network environment 200 also includes a serving node 230a and one or more non-serving nodes 240a. The serving node 230a generally services subject nodes located within corresponding serving node sector(s). However, in accordance with embodiments described herein, a serving node can service subject nodes outside of its corresponding coverage area 235a, particularly when the subject node employs a directional antenna to facilitate transmission and receipt of communication signals, as will be described. The serving node 230a is, as one of ordinary skill in the art may appreciate, a node (e.g., a BTS or eNodeB) that is presently providing services (e.g., sharing its radio resources) to a particular subject node, such as subject node 210. The non-serving node 240a is a node that is not presently providing services to subject node 210 when serviced by serving node 230a. Similar to serving node 230a, the non-serving node also has corresponding sector(s) and may be presently providing services to other subject nodes located within its corresponding coverage area 245a. In essence, the serving node 230a can be in communication with (i.e., receives an uplink signal from and sends a downlink signal to) a particular subject node, such as subject node 210, to facilitate communication between the subject node and the network 220.

In some instances, it is contemplated that the serving node 230a may also be a relay node. By way of example only, the subject node 210 can be a UE, and the serving node 230a can be a relay node configured to share radio resources with the subject node 210. In such a case, however, the relay node would also be in communication with another serving node (not shown) (for instance, a BTS or eNodeB) that is in direct communication with the network 220, so that all components (e.g., the subject node and the RN) can directly or indirectly communicate with the network 220. With respect to FIG. 2, however, the serving node 230a is illustrated and described herein as a BTS, eNodeB, or comparable node, while the subject node 210 is illustrated and described herein as a UE or a RN.

In one embodiment, the subject node 210 is in communication with serving node 230a. In other words, the subject node 210 transmits an uplink signal intended for serving node 230a, and receives a downlink signal from serving node 230a intended for subject node 210. As described herein above, communications between the serving node 230a and subject node 210 are intentional because, among other things, subject node 210 is located within the serving node's sector(s) (i.e., signal coverage area 235a) and the signal strength (e.g., power or SNR) of serving node's 230a downlink signals are higher (e.g., stronger) than other potential serving nodes. The subject node 210 can include and employ a directional antenna 215 to send and receive signals for communicating with the subject node 210. As was described above, directional antenna 215 can transmit an uplink signal having a much greater coverage area 217 and/or coverage distance than what a conventional omnidirectional antenna may cover. As such, the transmitted uplink signal may extend beyond a coverage area necessary to communicate with the serving node 230a, and undesirably interfere with one or more adjacent non-serving nodes, such as non-serving node 240a, located within the coverage area 217 of the transmitted uplink signal.

As will be explained in more detail with reference to FIG. 4, the uplink signal interference mitigation component 218 can mitigate uplink signal interference caused by the subject node's 210 transmitted uplink signal. More specifically, the uplink signal interference mitigation component 218 can reduce, based on downlink signals received by the subject node 210, a power level at which the uplink signal is transmitted by the subject node 210 in order to reduce the amount of interference caused by the transmitted uplink signal to unintended recipients of the signal. In some instances, reduction of the uplink signal transmit power level can reduce the coverage area 217 associated with the transmitted uplink signal. In this way, if the coverage area 217 is reduced such that an unintended recipient is no longer located in or is less encompassed by the transmitted uplink signal, then interference caused to the unintended recipient is naturally reduced. In further instances, reduction of the uplink signal transmit power level can reduce the strength of the uplink signal transmission so that signal interference caused to the unintended recipients (e.g., non-serving nodes) is tolerable.

Figure 3:
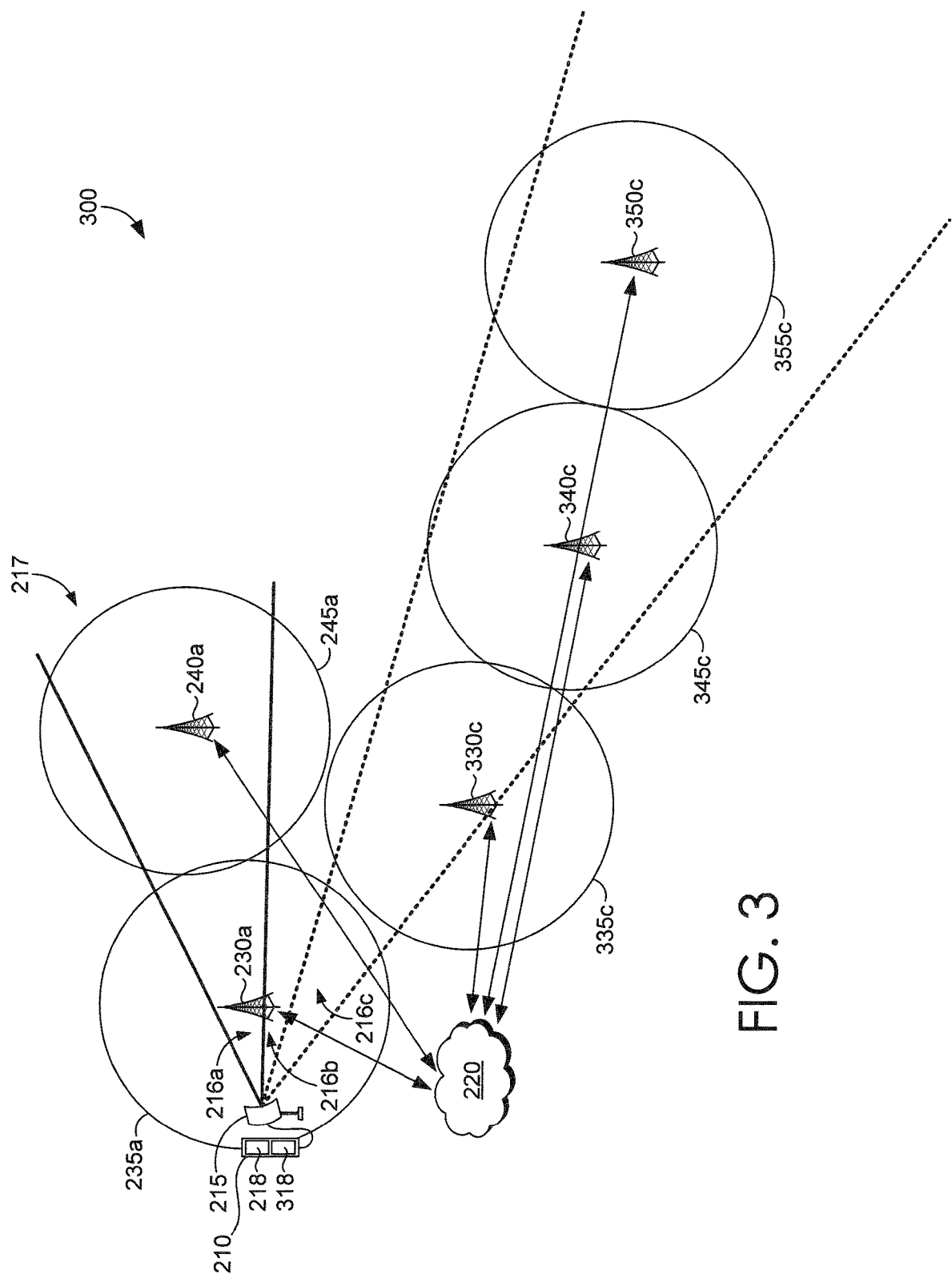
FIG. 3 is another schematic of an exemplary communications environment suitable for use in further embodiments of the present disclosure.

Turning now to FIG. 3, another exemplary network environment suitable for use in implementing further embodiments of the present disclosure is illustrated and designated generally as a network environment 300. Network environment 300 is but one example of a suitable network environment and is not intended to suggest any limitations as to the scope of use or functionality of embodiments described herein. Neither should the network environment be interpreted as having any dependency or requirement relating to any one or combination of components illustrated.

In the network environment 300, the network environment 200 of FIG. 2 is provided further including potential serving nodes 230a, 330c and corresponding non-serving nodes 240a, 340c, 350c. While the illustrations only show two potential serving nodes 230a, 330c and three corresponding non-serving nodes 240a, 340c, 350c, it is contemplated that any number of potential serving nodes and corresponding non-serving nodes be present in the network environment while remaining within the purview of the present disclosure. Among other things, the subject node 210 can further comprise an optimal antenna orientation determining component 318 for determining an optimal orientation for positioning the antenna of the subject node 210, as will be described. Although not shown, the directional antenna can be manually adjusted, electronically adjusted (e.g., via an electronic motor), or may comprise a plurality of directional antennas positioned at each of a plurality of potential orientations.

The optimal antenna orientation determining component 318 can determine an optimal orientation from a plurality of potential orientations for positioning the directional antenna 215 and/or transmitting an uplink signal from the directional antenna 215. In essence, the optimal antenna orientation determining component 318 determines which potential orientation for the antenna can provide the best balance between serving node downlink signal quality and subject node uplink signal interference mitigation. As will be described, the optimal antenna orientation determining component 318 can determine the optimal antenna orientation based on ascertained serving node signal power levels and calculated uplink signal transmit power reduction amounts for each potential orientation in a plurality of potential orientations. As will be referenced herein, an "orientation" can be an azimuthal angle or degrees of rotation from a reference point at which a directional antenna is pointed.

While some embodiments described herein describe the optimal antenna orientation determining component 318 as providing instructions to an electric motor configured to adjust the orientation of the directional antenna 215 of subject node 210, it is contemplated that a variety of implementations for determining an optimal orientation of a directional antenna be within the purview of the present disclosure. In one example, a plurality of directional antennas positioned at various potential orientations can be coupled to subject node 210 and activated one-by-one, where one of the plurality of directional antennas facing a particular potential orientation can be determined as the optimal orientation by the optimal antenna orientation determining component 318.

In another example, the directional antenna is not motor driven, but configured to be manually adjusted to each of a plurality of potential orientations provided for display by an orientation indicator. In this regard, the optimal antenna orientation determining component 318 can provide prompts, via the orientation indicator, to adjust the positioning of the antenna to each potential orientation. The optimal antenna orientation determining component 318 can further coordinate the ascertaining of signal characteristics and calculating of uplink transmit power reduction levels at each potential orientation, in order to determine the optimal orientation for positioning the directional antenna 215, in accordance with embodiments described herein. To this end, the optimal antenna orientation determining component 318 can provide for display the determined optimal orientation based on data obtained at each potential orientation.

In an embodiment, the network environment 300 includes one or more potential serving nodes, such as potential serving nodes 230a, 330c, and one or more non-serving nodes, such as non-serving nodes 240a, 340c. The subject node 210 could communicate with any one of the plurality of potential serving nodes 230a, 330c, based on an orientation in which the directional antenna 215 is positioned. However, some of the potential orientations may result in diminished connection quality. For instance, when the subject node's antenna is positioned in a particular orientation, a downlink signal from a potential serving node corresponding to that particular orientation may be strong, but excessive interference caused to one or more non-serving nodes by the subject node when its antenna is positioned at the particular orientation may require a large amount of interference mitigation for adjacent non-serving nodes. As a consequence, the uplink signal strength will need to be reduced, thereby diminishing the signal/connection quality to the serving node. In another instance, when compared to other potential orientations, a particular orientation may point to a particular serving node that provides weaker signal/connection quality with the subject node, but may require little to no interference mitigation. In an effort to determine an optimal orientation for the directional antenna 215 of the subject node 210, the subject node 210 employs the optimal antenna orientation determining component 318 to generate data when the antenna is positioned at each potential orientation, and determine, based on the generated data, an optimal orientation to position the directional antenna.

The subject node 210 can be in communication with one serving node at a time. That is, the subject node 210 exchanges radio transmissions with one particular serving node that can enable the subject node's 210 connectivity to the network 220. In circumstances where the subject node's uplink signal reaches a non-serving node, the subject node's uplink signal may cause interference therewith. It is also contemplated that the subject node's antenna can detect (hereinafter also referenced as "receive") downlink signals from one or more non-serving nodes, especially in circumstances where non-serving nodes are adjacent to a serving node and/or within the coverage area of the subject node uplink signal.

Generally, communications between the serving node 230a and subject node 210 are intentional because, among other things, the subject node 210 has determined that the signal strength of serving node's 230a downlink signals are higher (i.e., stronger) than other potential serving nodes, thereby providing better signal quality to the subject node 210. In accordance with embodiments described herein, the subject node 210 can determine an optimal orientation for positioning its directional antenna and select a serving node based on potential serving node downlink signal strengths and the levels of interference caused to adjacent non-serving nodes when positioned at each potential orientation.

As was described above, directional antenna 215 can transmit an uplink signal having a much greater coverage area 217 and/or coverage distance than what a conventional omnidirectional antenna may cover. As such, the transmitted uplink signal may extend beyond a coverage area necessary to communicate with the serving node 230a, and undesirably interfere with one or more adjacent non-serving nodes, such as non-serving node 240a, located within the coverage area 217 of the transmitted uplink signal.

As will be explained in more detail with reference to FIGS. 4-5, the optimal antenna orientation determining component 318 can determine an optimal orientation for positioning a directional antenna of a subject node. More specifically, the optimal antenna orientation determining component 318 can communicate with a directional antenna, or components thereof, to transmit an uplink signal at a non-reduced power level (i.e., not having any power reduction applied thereto) to each of plurality of potential orientations and obtain data therefrom. Based on the data obtained from the directional antenna at each of the potential orientations, the optimal antenna orientation determining component 318 can determine which of the potential orientations provides the best serving sector.

Figure 4:
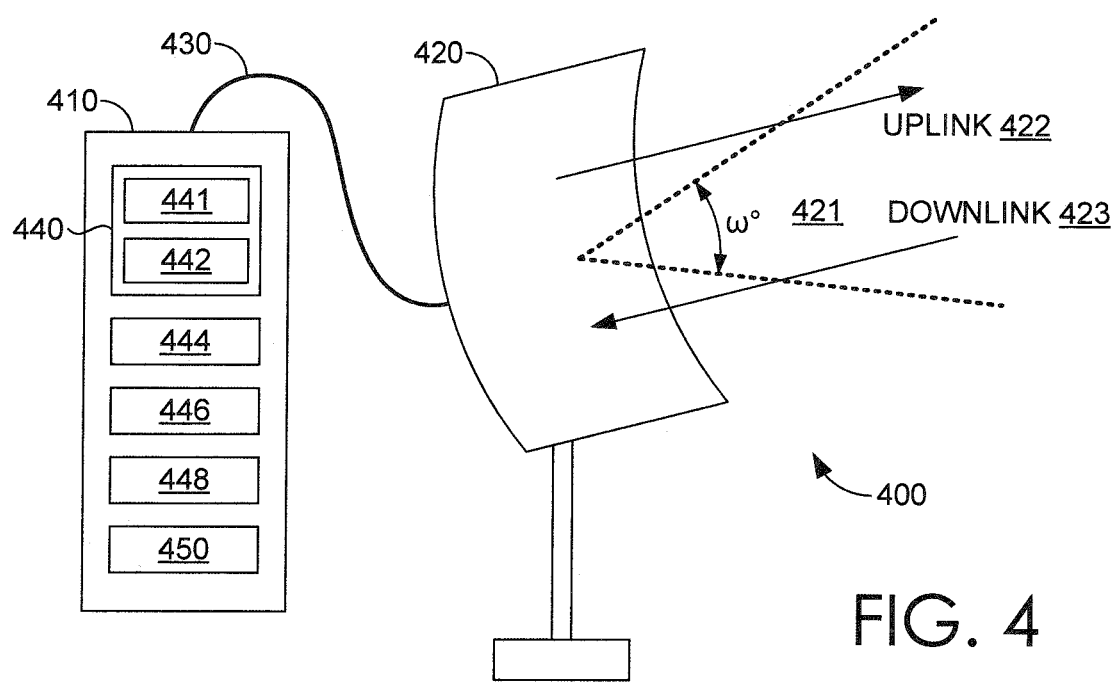
FIG. 4 is a schematic of an exemplary uplink signal interference mitigation system and an optimal antenna orientation determination system, in accordance with some embodiments of the present disclosure.

Moving now to FIG. 4, in reference generally to subject node 210 of FIG. 2, uplink signal interference mitigation component 218 of FIGS. 2 and 3, and optimal antenna orientation determining component 318 of FIG. 3, an exemplary configuration of a system 400 configured to mitigate uplink signal interference to non-serving nodes and/or determine an optimal orientation of a directional antenna is provided. The illustrated system 400 includes a subject node 410 coupled to an antenna 420. In accordance with embodiments herein, an antenna 420 can comprise one or more antennas. More specifically, the subject node 410 can be configured to support multiple-input and multiple-output ("MIMO") for spectral efficiency, as one of ordinary skill in the art may appreciate, and as such, may comprise more than one antenna.

The radio 440 includes a receiver 441 and a transmitter 442. The receiver 441 is configured to receive and/or demodulate downlink signals 423 received by way of the antenna 420. The transmitter 442, on the other hand, is configured to transmit and/or modulate uplink signals 422 for transmission by way of the antenna 420. The transmitter 442 can communicate to the antenna 420 for transmission, the uplink signals 422 having a power level that can be adjusted by the subject node 410 or components thereof. It is contemplated that the paths and any other connections between the illustrated components can be facilitated through a direct wired connection (e.g., fiber optics or electrical wiring), such as wire (e.g., coaxial cable) 430, or through an indirect connection (e.g., through a network router).

In some embodiments, the antenna 420 can have an associated gain value that corresponds to an amount of power that the antenna can transmit the uplink signal 422. In other words, the antenna gain corresponds to how well the antenna 420 focuses the transmitter output power into a particular direction or orientation in which the antenna 420 is positioned. The antenna 420 can also be configured with a beam width 421 that corresponds to a propagation width and area of a transmitted uplink signal. To this end, when employing the antenna 420, the subject node 410 can transmit the uplink signal 422 from the subject node 410 with a total uplink signal transmit power level that is based at least in part on a sum of the an uplink signal transmit power level and a gain level associated with the antenna 420.

While the exemplary configuration embodies a directional antenna, it is contemplated that any number or type of antennas be employed while remaining within the scope of the present disclosure. For instance, the antenna 420 can be an omnidirectional antenna. In another instance, the antenna 420 can be a plurality of directional antennas each positioned in a potential orientation.

The subject node 410 can include various components configured to analyze downlink signals received by the antenna 420. The subject node 410 can include, among other things, a RF signal processor 444 (e.g., a digital signal processor) configured to analyze downlink signals 423 received by the antenna 420 of the subject node 410. The RF signal processor 444 may include the ability to ascertain characteristics of the signals 423 being received by the subject node 410. Characteristics ascertained by the RF signal processor 444 may include, among other things, whether the received signal 423 is from a serving node or a non-serving node, which serving node or non-serving node the received signal is from, power measurements of the received signal (e.g., SNR, SINR, RSSI, RSRP, RSRQ, average power, power, etc.).

In one embodiment, the subject node 410 may also include an uplink signal interference mitigation component 446 configured to mitigate the amount of uplink signal interference caused to one or more non-serving nodes by the subject node 410 by reducing the transmit power level of the uplink signal. In further embodiments, the subject node 410 may also include an optimal antenna orientation determining component 448 configured to determine an optimal orientation at which to position the antenna 420. Further, while the illustrated embodiment shows the uplink signal interference mitigation component 446 and optimal antenna orientation determining component 448 as subcomponents of the subject node 410, it is contemplated that any combination of the components can also be subcomponents or features of the radio 440. In embodiments, the subject node 410 also includes a memory 450, comprising one or more computer-readable media configured to store data and instructions for mitigating uplink signal interference and determining optimal antenna orientation, in accordance with embodiments described herein.

As was described hereinabove, the uplink signal interference mitigation component 446 can be configured to reduce the amount of interference caused by the uplink signal 422 of the subject node 410 to one or more non-serving nodes (not shown) adjacent to a serving node (not shown) or otherwise within the coverage area of the uplink signal 422. The uplink signal interference mitigation component 446 can reduce the amount of interference caused to the one or more non-serving nodes by reducing the uplink transmit power levels in transmitter 442. In accordance with embodiments described herein, a non-serving node is generally "adjacent" to a serving node when it neighbors a serving node. The non-serving nodes affected by the uplink signal 422 typically include, but are not limited to, non-serving nodes located within the coverage area of the uplink signal 422.

In embodiments, the subject node 410 employs the antenna 420 to transmit an uplink signal 422 to a serving node. At the same time, the antenna 420 can receive one or more downlink signals 423 from a variety of nodes, including the serving node and one or more non-serving nodes. In this regard, the antenna 420 may receive a serving node downlink signal and one or more non-serving node downlink signals. The downlink signals 423 are communicated to the RF signal processor 444 and analyzed thereby to ascertain characteristics of the received downlink signals. As was described, ascertained characteristics for each downlink signal 423 received may include the node of signal origin, a serving or non-serving state of the originating node with respect to the subject node 410, a received signal power level corresponding to the received downlink signal, among many other characteristics. In some embodiments, the ascertained characteristics can be stored in a memory 450 of the subject node.

The uplink signal interference mitigation component 446 can either interface (i.e., communicate) with the RF signal processor 444, or retrieve data from memory 450, to obtain the ascertained signal characteristics of the received downlink signals. The uplink signal interference mitigation component 446 can obtain and analyze the characteristics of the received downlink signals originating from both the serving node and the one or more non-serving nodes. In instances where the uplink signal interference mitigation component 446 determines, based on the ascertained signal characteristics, that only one particular non-serving node is responsible for sending the received non-serving node downlink signal(s), the uplink signal interference mitigation component 446 will select the received non-serving node downlink signals from the particular non-serving node for further analysis.

In instances where the uplink signal interference mitigation component 446 determines that a plurality of non-serving node downlink signals were received, the uplink signal interference mitigation component 446 can determine which one of the received non-serving node downlink signals has a strongest signal power level. To this end, the uplink signal interference mitigation component 446 will select the non-serving node downlink signal with the strongest signal power level for further analysis. In essence, the non-serving node downlink signal with the strongest signal power level is selected to determine whether the transmitted uplink signal 422 causes excessive interference with the particular non-serving node corresponding to the selected "strongest" non-serving node downlink signal.

The uplink signal interference mitigation component 446 can determine that the transmitted uplink signal 422 causes excessive interference with the particular non-serving node by employing at least one of the methods described herein. In one instance, a power level threshold may be predefined (for instance, by an administrator or manufacturer of one or more components of system 400) and utilized to compare with the signal power level of the selected non-serving node downlink signal. When the uplink signal interference mitigation component 446 determines that the signal power level of the selected non-serving node downlink signal exceeds the power level threshold, a determination is made that the uplink signal 422 transmitted by the subject node 410 is causing excessive interference to the non-serving node corresponding to (i.e., responsible for transmitting) the selected non-serving node downlink signal.

The uplink signal interference mitigation component 446 can interface with the radio 440 to adjust the transmit power level of the uplink signal in order to mitigate the interference caused to the particular non-serving node. In more detail, the uplink signal interference mitigation component 446 can determine a specific amount to adjust the uplink signal transmit power level based on how much the signal power level of the selected non-serving node downlink signal exceeds the power level threshold. In essence, the uplink signal interference mitigation component 446 instructs the radio 440 to reduce the transmit power level of the uplink signal by the difference of the selected non-serving node downlink signal power level and the power level threshold.

In another instance, a lookup table may be employed by the uplink signal interference mitigation component 446 for referencing the ascertained signal power level of the selected non-serving node downlink signal. The lookup table can be stored in any one of the components of subject node 410, including memory 450. The lookup table provides, for any referenced signal power level associated with a particular non-serving node downlink signal, a corresponding power reduction amount for mitigating uplink signal interference caused to the non-serving node responsible for transmitting the non-serving node downlink signal.

In some instances, the lookup table may indicate that no power reduction is necessary and thus the subject node does not apply any interference mitigation to the uplink signal 422. In other instances, the lookup table may provide a power reduction amount that enables the uplink signal interference mitigation component 446 to determine, among other things, that the uplink signal 422 transmitted by the subject node 410 is causing excessive interference to the particular non-serving node corresponding to the selected non-serving node downlink signal. When the uplink signal interference mitigation component 446 determines that excessive interference to the particular non-serving node is caused by the uplink signal 422, it obtains the appropriate power reduction amount referenced via the lookup table, and instructs the radio 440 to reduce the transmit power level of the uplink signal 422 by the referenced power reduction amount. In this regard, the interference caused to the particular non-serving node (and any other non-serving nodes) by the uplink signal 422 is mitigated.

In some instances, a server sector may send a request to the subject node, requesting that the subject node increase its uplink signal transmit power level. Such requests are typically made in traditional power control procedures between serving nodes and subject nodes. In this regard, for such configurations, power reduction must be applied at all times that the subject node is transmitting, except while performing initialization procedures. For instance, if a serving sector requests that the subject node increase its uplink signal transmit power level, the subject node can be configured to reject the request by reporting (to the serving node) a false negative. For example, a false negative may be a communication, from the subject node to the serving node, indicating a negative power headroom, or that a maximum transmit power level has been reached, among other things. In essence, the false negative is communicated from the subject node to the serving node, indicating that an uplink signal transmit power level increase cannot be performed by the subject node.

It is within the purview of the present disclosure that the uplink signal interference mitigation component 446 can be configured to determine whether the transmitted uplink signal creates excessive interference with a particular non-serving node and to take action (e.g., reduce the uplink signal transmit power level) based on the determination in response to the passing of any predefined interval (e.g., every 24 hours, 7 days, 1 year, etc.), a received command, a setup or power-up procedure, any other scheduled event, or even unscheduled events (e.g., weather interference or service interruptions). It is also contemplated that in response to a passing of each interval or in response to a received command, the power reduction amount is reset to a null value by the uplink signal interference mitigation component 446, such that a new determination on excessive interference and uplink signal transmit power reduction amount is made.

As was also described hereinabove, the optimal antenna orientation determining component 448 can be configured to determine an optimal orientation at which to position the antenna 420. The optimal antenna orientation determining component 448 can determine which potential orientation, among a plurality of potential orientations, is an optimal orientation at which the subject node 410 can receive a strong downlink signal from a serving node while causing minimal interference to adjacent non-serving nodes. The optimal antenna orientation determining component 448 can, among other things, provide instructions to transmit the uplink signal 422 from the subject node 410 and receive one or more downlink signals 423 at each potential orientation and make a determination for the optimal orientation based on data obtained at each potential orientation. As was described, the instructions can be sent to a motor for rotating the antenna to each potential orientation, a graphical interface or indicator for manually adjusting the antenna to each potential orientation, or a fixed array of directional antennas pointing at each potential orientations.

In some embodiments, each potential orientation can be manually provided to the optimal antenna orientation determining component 448. For instance, each potential orientation can be stored in a memory 450 of subject node 410, or programmatically input to the optimal antenna orientation determining component 448. In some embodiments, each potential orientation can be determined by the optimal antenna orientation determining component 448 when an input comprising a range of orientations and/or a rotation interval is provided thereto.

Figure 5:
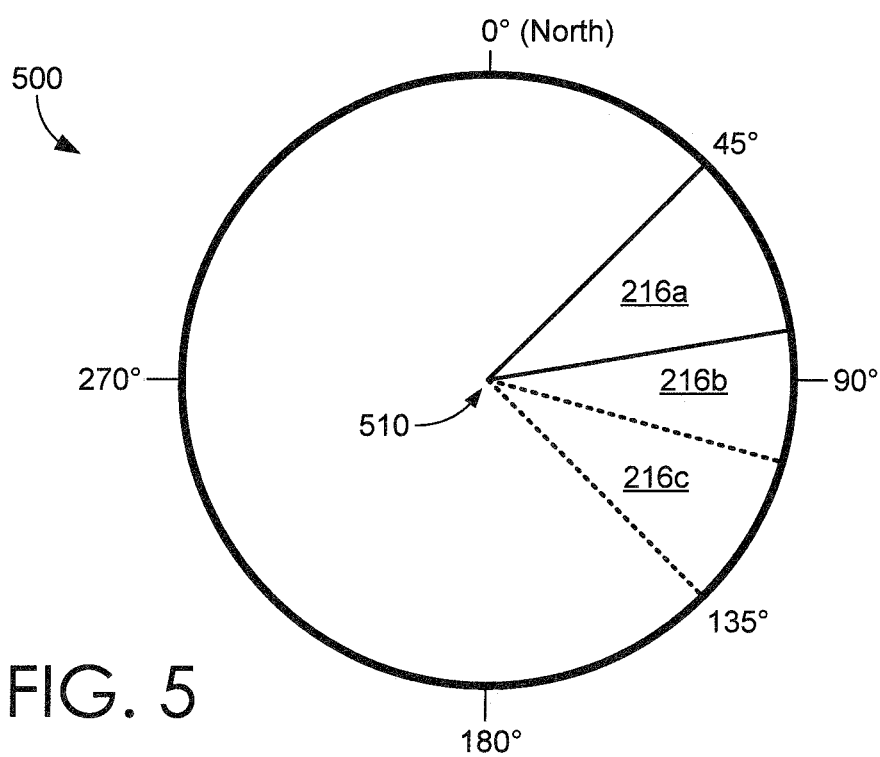
FIG. 5 depicts a graphical representation of potential antenna orientations, in accordance with some embodiments of the present disclosure.

For instance, looking briefly at FIG. 5, a diagram 500 representing azimuthal directions for a directional antenna is provided. More specifically, the diagram illustrates a range of potential orientations at which an antenna 510 can be positioned. In some instances, the range of potential orientations can be 360-degrees around a reference point, such as the 0-degree marker. By way of example only, if a rotation interval of 15-degrees is provided along with a 360-degree range of orientations, a total of 24 different potential orientations may be determined by the optimal antenna orientation determining component 448.

In another instance, looking at diagram 500 in light of FIG. 3, there are two known potential serving nodes 230a, 330c for subject node 210. By way of example only, the two known potential serving nodes 230a, 330c are known to be located between the 45-degree and 135-degree reference points, respective of antenna 510. In some embodiments, this range (e.g., 45-135) can be provided to the optimal antenna orientation determining component 448, with a rotation interval (e.g., 30 degrees), so that the antenna orientation determining component 448 can determine each potential orientation. Here, diagram 500 illustrates three potential orientations determined for positioning the antenna: roughly 70-degrees 216a, 100-degrees 216b, and 130-degrees 216c. It is contemplated that the aforementioned methods for determining the potential orientations are by way of non-limiting example only, and that any method for determining potential orientations can be employed within the scope of the present disclosure.

In embodiments, the subject node 410 employs the antenna 420 to transmit an uplink signal 422 toward each potential orientation. The subject node 410 may or may not be in communication with a potential serving node when positioned at any one of the potential orientations. In any one of the potential orientations, the antenna 420 can receive one or more downlink signals 423 from a variety of nodes, which may include a potential serving node and one or more non-serving nodes. However, in some potential orientations, there may be no nodes suitable to service the subject node. Thus, it is possible that no downlink signals 423 are received by the subject node 410 in some of the potential orientations.

In some potential orientations, however, the antenna 420 may receive any combination of one or more serving node downlink signals and/or one or more non-serving node downlink signals. The downlink signals 423 are communicated to the RF signal processor 444 and analyzed thereby to ascertain characteristics of the received downlink signals. As was described, ascertained characteristics for each downlink signal 423 received may include the node of signal origin, a serving or non-serving state of the originating node with respect to the subject node 410, a received signal power level corresponding to the received downlink signal, among many other characteristics. In some embodiments, the ascertained characteristics can be stored in a memory 450 of the subject node. In accordance with embodiments described herein, a serving node downlink signal having the strongest power level among a plurality of serving node downlink signals is selected as the particular serving node for the subject node 410 at each potential orientation. Similarly, a non-serving node downlink signal having the strongest power level among a plurality of non-serving node downlink signals is selected as the particular non-serving node for the subject node 410 at each potential orientation.

The optimal antenna orientation determining component 448 can store in memory 450, or coordinate the storage thereto, a signal power level ascertained by RF signal processor that corresponds to the particular (i.e., "strongest") serving node at each potential orientation. In addition, the optimal antenna orientation determining component 448 can further store or coordinate the storage of an uplink signal transmit power reduction amount determined by the uplink signal interference mitigation component 446 for each potential orientation, in accordance with embodiments of the present disclosure. In some embodiments, the optimal antenna orientation determining component 448 can calculate a sum, for each potential orientation, both the ascertained serving node signal power level for the particular serving node and the uplink signal transmit power reduction amount for a particular non-serving node. The sum value represents the balance between the serving node downlink signal strength and required uplink signal interference mitigation when the antenna 420 is positioned at any one potential orientation.

It is contemplated that the power reduction amount determined by the uplink signal interference mitigation component 446 at each potential orientation is reset to a null value prior to changing the orientation of uplink signal transmissions (e.g., by repositioning the antenna), but after the data corresponding to the potential orientation is stored. In this way, the optimal antenna orientation determining component 448 can store accurate data for each potential orientation before determining which potential orientation is the optimal orientation.

In one embodiment, the optimal antenna orientation determining component 448 can determine the optimal orientation by determining which one of the stored sum values corresponding to one of the potential orientations is a maximum sum. In other words, the optimal antenna orientation determining component 448 determines which sum value stored for the potential orientations represents the highest value. In this regard, the potential orientation corresponding to the maximum sum is determined to be the optimal orientation for the antenna. In essence, at the optimal orientation, the serving node downlink signal power level is high and the adjacent non-serving node downlink signal power level is low.

In another embodiment, the optimal antenna orientation determining component 448 can determine the optimal orientation by comparing predetermined thresholds to both the "strongest" ascertained serving node signal power level and non-serving node signal power level corresponding to each potential orientation. More specifically, each "strongest" ascertained serving node signal power level is compared to a predetermined serving node signal power level threshold. Any ascertained serving node signal power levels that are less than the predetermined serving node signal power level threshold are removed from consideration. Further, each "strongest" ascertained non-serving node signal power level is compared to a predetermined non-serving node signal power level threshold. Any ascertained non-serving node signal power levels that are greater than the predetermined serving node signal power level threshold are removed from consideration. In essence, the optimal antenna orientation determining component 448 can determine the optimal orientation where both the "strongest" ascertained serving node signal power level corresponding to a particular orientation exceeds the predetermined serving node signal power level threshold and the predetermined serving node signal power level threshold exceeds the "strongest" ascertained non-serving node signal power level also corresponding to the particular orientation. It is contemplated that, outside of handover operations, the serving node signal power level is generally higher than the non-serving node signal power level.

Turning now to FIGS. 6, 7, and 8, methods for mitigating uplink signal interference to non-serving nodes are provided. In particular, FIGS. 6-8 show flow diagrams illustrating methods to mitigate uplink signal interference attributed to overreach of uplink signals transmitted from directional antennas, in accordance with embodiments of the present disclosure. It will be understood by those of ordinary skill in the art that the order of steps shown in the method 600 of FIG. 6, method 700 of FIG. 7, and method 800 of FIG. 8, are not meant to limit the scope of the present disclosures in any way and, in fact, the steps may occur in a variety of different sequences within embodiments hereof. Any and all such variations, and any combination thereof, are contemplated to be within the scope of embodiments described herein.

With initial reference to FIG. 6, in embodiments, method 600 can be performed at a subject node, such as subject node 210 of FIG. 2. More specifically, method 600 might be performed by an uplink signal interference mitigation component 218 of FIG. 2. Initially, as indicated at block 610, an uplink signal is transmitted from a subject node to a serving node. The uplink signal is transmitted with a total uplink signal transmit power level that is based at least in part on a gain level of an antenna coupled to the subject node and/or an adjustable uplink signal transmit power level associated with the subject node, among other things.

At block 620, at least a particular non-serving node downlink signal is received from a particular non-serving node. The particular non-serving node downlink signal can be one of a plurality of non-serving node downlink signals received by the subject node. Each one of the non-serving node downlink signals have signal characteristics, such as a received signal power level, that can be ascertained by the subject node or components thereof. The particular non-serving node downlink signal is selected from the plurality of non-serving node downlink signals for having the strongest power level associated therewith.

At block 630, a determination is made by the subject node that the transmitted uplink signal creates excessive interference with the particular non-serving node. The determination is made by the subject node based on the received signal power level that corresponds to the non-serving node downlink signal received from the particular non-serving node.

At block 640, the subject node reduces the total uplink signal transmit power level in response to determining that the transmitted uplink signal creates excessive interference with the particular non-serving node.

Turning now to FIG. 7, in embodiments, method 700 can be performed at a subject node, such as subject node 210 of FIG. 2. More specifically, method 700 might be performed by an uplink signal interference mitigation component 218 of FIG. 2. Initially, as indicated at block 710, an uplink signal is transmitted from a first node to a second node. The uplink signal is transmitted using an uplink signal transmit power level. The second node and at least a third node are located within a coverage area of the transmitted uplink signal. The coverage area is based in part on the uplink signal transmit power level. The first node can be a relay node, the second node can be a first base transceiver station configured to serve the relay node, and the third node is a second base transceiver station that is located within an initial coverage area of the uplink signal.

At block 720, a downlink signal from the third node is received at the first node. The received downlink signal has at least one signal characteristic, for instance a signal power level, that is determined by the first node.

At block 730, the uplink signal transmit power level is reduced by an amount that is based in part on the determined at least one signal characteristic of the third node downlink signal. The uplink signal coverage area is also reduced in response to reducing the uplink signal transmit power level. Once the uplink signal transmit power level is reduced, the third node is not located within the reduced coverage area of the uplink signal.

Turning now to FIG. 8, in embodiments, method 800 can be performed at a subject node, such as subject node 210 of FIG. 2. More specifically, method 800 might be performed by an uplink signal interference mitigation component 218 of FIG. 2. Initially, as indicated at block 810, an uplink signal is transmitted from a relay node to a serving node. The uplink signal is transmitted with a total uplink signal transmit power level that is based at least in part on a gain level of a directional antenna coupled to the subject node and/or an adjustable uplink signal transmit power level associated with the relay node, among other things.

At block 820, the relay node receives at least a particular non-serving node downlink signal from a particular non-serving node. The particular non-serving node downlink signal can be one of a plurality of non-serving node downlink signals received by the relay node. Each one of the non-serving node downlink signals have signal characteristics, such as a received signal power level, that can be ascertained by the relay node or a component thereof. The particular non-serving node downlink signal is selected from the plurality of non-serving node downlink signals for having the strongest power level associated therewith.

At block 830, a determination is made by the relay node that the transmitted uplink signal creates excessive interference with the particular non-serving node. The determination is made by the relay node determining that the ascertained signal power level that corresponds to the non-serving node downlink signal received from the particular non-serving node exceeds a predetermined threshold.

At block 840, the relay node reduces the adjustable uplink signal transmit power level in response to determining that the ascertained downlink signal power level of the received non-serving node downlink signal exceeds the predetermined threshold. As a result, the total uplink signal transmit power level at which the uplink signal is transmitted is also reduced.

Figures 10, 11:
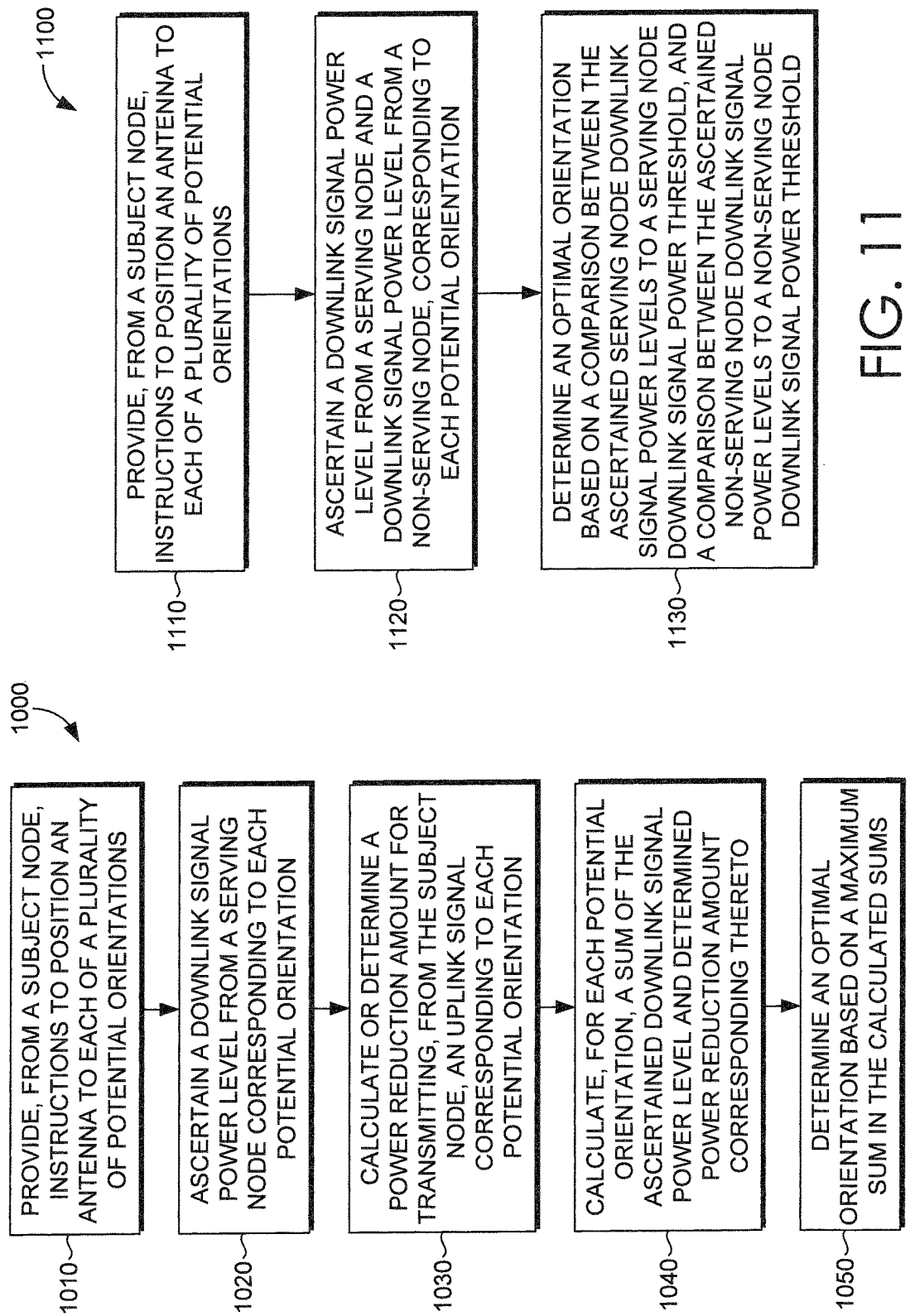

Turning now to FIGS. 9, 10, and 11, methods for determining optimal orientations for positioning a directional antenna are provided. In particular, FIGS. 9-11 show flow diagrams illustrating methods to determining which of a plurality of potential orientations is optimal for maintaining an optimal balance of serving node signal strength and uplink signal interference mitigation, in accordance with embodiments of the present disclosure. It will be understood by those of ordinary skill in the art that the order of steps shown in the method 900 of FIG. 9, method 1000 of FIG. 10, and method 1100 of FIG. 11, are not meant to limit the scope of the present disclosures in any way and, in fact, the steps may occur in a variety of different sequences within embodiments hereof. Any and all such variations, and any combination thereof, are contemplated to be within the scope of embodiments described herein.

Turning now to FIG. 9, in embodiments, method 900 can be performed at a subject node, such as subject node 210 of FIG. 2. More specifically, method 900 might be performed by an optimal antenna orientation determining component 318 of FIG. 3. Initially, as indicated at block 910, instructions are provided by the subject node to position a directional antenna coupled to the subject node in each potential orientation in a plurality of potential orientations. In other words, instructions are provided to change the direction at which the uplink signals are transmitted from the subject node.

At block 920, a signal power level corresponding to a particular serving node is ascertained by the subject node for each potential orientation in which the directional antenna is positioned. In accordance with embodiments described herein, the particular serving node is the serving node that is associated with the "strongest" serving node downlink signal received by the subject node.

At block 930, a power reduction amount for transmission of the uplink signal is calculated or determined by the subject node, or components thereof, for each potential orientation in which the directional antenna is positioned. In accordance with embodiments described herein, the power reduction amount for any one of the potential orientations is determined based on a "strongest" non-serving node downlink signal received by the subject node when the directional antenna is in the potential orientation.

At block 940, the subject node makes a determination that one of the potential orientations is an optimal orientation based on the serving node signal power levels ascertained by the subject node, and the power reduction amounts calculated for the uplink signal. More specifically, the optimal orientation can be determined when a particular orientation corresponds to a serving node signal power level and a calculated power reduction amount that produces a sum that is greater than the sum of corresponding values in any other potential orientation.

Turning now to FIG. 10, in embodiments, method 1000 can be performed at a subject node, such as subject node 210 of FIG. 2. More specifically, method 1000 might be performed by an optimal antenna orientation determining component 318 of FIG. 3. Initially, as indicated at block 1010, instructions are provided by the subject node to position a directional antenna coupled to the subject node in each potential orientation in a plurality of potential orientations. In other words, instructions are provided to change the direction at which the uplink signals are transmitted from the subject node.

At block 1020, a signal power level corresponding to a particular serving node is ascertained by the subject node for each potential orientation in which the directional antenna is positioned. In accordance with embodiments described herein, the particular serving node is the serving node that is associated with the "strongest" serving node downlink signal received by the subject node.

At block 1030, a power reduction amount for transmission of the uplink signal is calculated or determined by the subject node, or components thereof, for each potential orientation in which the directional antenna is positioned. In accordance with embodiments described herein, the power reduction amount for any one of the potential orientations is determined based on a "strongest" non-serving node downlink signal received by the subject node when the directional antenna is in the potential orientation.

At block 1040, a sum of the signal power level and power reduction amount corresponding to each potential orientation is calculated for each potential orientation. At block 1050, the subject node makes a determination that one of the potential orientations is an optimal orientation based on the one of the potential orientations having a maximum sum. More specifically, the optimal orientation can be determined when a particular orientation corresponds to a serving node signal power level and a calculated power reduction amount that produces a sum that is greater than the sum of corresponding values in any other potential orientation.

Turning now to FIG. 11, in embodiments, method 1100 can be performed at a subject node, such as subject node 210 of FIG. 2. More specifically, method 1100 might be performed by an optimal antenna orientation determining component 318 of FIG. 3. Initially, as indicated at block 1110, instructions are provided by the subject node to position a directional antenna coupled to the subject node in each potential orientation in a plurality of potential orientations. In other words, instructions are provided to change the direction at which the uplink signals are transmitted from the subject node.

At block 1120, a signal power level corresponding to a particular serving node and a signal power level corresponding to a particular non-serving node is ascertained by the subject node for each potential orientation in which the directional antenna is positioned. In accordance with embodiments described herein, the particular serving node is the serving node that is associated with the "strongest" serving node downlink signal received by the subject node, and the particular non-serving node is the non-serving node that is associated with the "strongest" non-serving node downlink signal received by the subject node.

At block 1130, the subject node makes a determination that one of the potential orientations is an optimal orientation based on the serving node signal power levels ascertained by the subject node. More specifically, the optimal orientation can be determined when a particular orientation corresponds to an ascertained serving node signal power level that exceeds a serving node signal power threshold, and further corresponds to a non-serving node signal power threshold that exceeds an ascertained non-serving node signal power level.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A computer-implemented method comprising:
  causing, by a computing device, an electronic motor to position a directional antenna configured to transmit an uplink signal in each orientation of a plurality of potential orientations;
  ascertaining, by the computing device, a corresponding serving node signal power level and a corresponding non-serving node signal power level for each orientation of the plurality of potential orientations based on a corresponding plurality of signals received via the directional antenna positioned in the orientation, the corresponding serving node signal power level being ascertained for each orientation based on a corresponding strongest serving node signal of at least one serving node signal received in the orientation, and the corresponding non-serving node signal power level being ascertained for each orientation based on a corresponding strongest non-serving node signal of at least one non-serving node signal received in the orientation;

selecting, by the computing device, one of the plurality of potential orientations as an optimal orientation based on a first comparison of each ascertained corresponding serving node signal power level to a predefined serving node signal power threshold, and a second comparison of each corresponding ascertained non-serving node signal power level to a predefined non-serving node signal power threshold; and causing, by the computing device, the electronic motor to position the directional antenna in the selected optimal orientation.

2. The computer-implemented method of claim 1, wherein the optimal orientation is selected from at least a portion of the plurality of potential orientations, each orientation of the portion of the plurality of potential orientations being determined based on a first determination that the ascertained corresponding serving node threshold is greater than the predefined serving node threshold, and a second determination that the ascertained corresponding non-serving node threshold is less than the predefined serving node threshold.

3. The computer-implemented method of claim 1, wherein the optimal orientation is selected based further on a determination that the ascertained corresponding serving node power level is greater than the ascertained corresponding non-serving node power level.

4. The computer-implemented method of claim 1, wherein to position the directional antenna in one orientation of the plurality of potential orientations is to transmit the uplink signal in a direction that corresponds to the orientation.

5. The computer-implemented method of claim 1, wherein the plurality of potential orientations is determined based on a received input that defines a range of potential orientations.

6. The computer-implemented method of claim 1, wherein for each orientation, the at least one serving node signal received in the orientation is communicated from a corresponding at least one serving node, and the at least one non-serving node signal received in the orientation is communicated from a corresponding at least one non-serving node.

7. The computer-implemented method of claim 6, wherein for each orientation, the corresponding at least one serving node is within at least a portion of a coverage area of the corresponding at least one non-serving node.

8. A non-transitory computer storage medium storing computer-useable instructions that, when used by one or more computing devices, cause the one or more computing devices to perform operations comprising:

causing an electronic motor to position a directional antenna configured to transmit an uplink signal in each orientation of a plurality of potential orientations;

ascertaining a corresponding serving node signal power level and a corresponding non-serving node signal power level for each orientation of the plurality of potential orientations based on a corresponding plurality of signals received via the directional antenna positioned in the orientation, the corresponding serving node signal power level being ascertained for each orientation based on a corresponding strongest serving node signal of at least one serving node signal received in the orientation, and the corresponding non-serving node signal power level being ascertained for each orientation based on a corresponding strongest non-serving node signal of at least one non-serving node signal received in the orientation;

selecting one of the plurality of potential orientations as an optimal orientation based on a first comparison of each ascertained corresponding serving node signal power level to a predefined serving node signal power threshold, and a second comparison of each corresponding ascertained non-serving node signal power level to a predefined non-serving node signal power threshold; and causing the electronic motor to position the directional antenna in the selected optimal orientation.

9. The non-transitory computer storage medium of claim 8, wherein the optimal orientation is selected from at least a portion of the plurality of potential orientations, each orientation of the portion of the plurality of potential orientations being determined based on a first determination that the ascertained corresponding serving node threshold is greater than the predefined serving node threshold, and a second determination that the ascertained corresponding non-serving node threshold is less than the predefined serving node threshold.

10. The non-transitory computer storage medium of claim 8, wherein the optimal orientation is selected based further on a determination that the ascertained corresponding serving node power level is greater than the ascertained corresponding non-serving node power level.

11. The non-transitory computer storage medium of claim 8, wherein to position the directional antenna in one orientation of the plurality of potential orientations is to transmit the uplink signal in a direction that corresponds to the orientation.

12. The non-transitory computer storage medium of claim 8, wherein the plurality of potential orientations is determined based on a received input that defines a range of potential orientations.

13. The non-transitory computer storage medium of claim 8, wherein for each orientation, the at least one serving node signal received in the orientation is communicated from a corresponding at least one serving node, and the at least one non-serving node signal received in the orientation is communicated from a corresponding at least one non-serving node.

14. The non-transitory computer storage medium of claim 13, wherein for each orientation, the corresponding at least one serving node is adjacent to the corresponding at least one non-serving node.

15. A computerized system comprising:

a directional antenna control means for causing an electronic motor to position a directional antenna in each orientation of a plurality of potential orientations, wherein the directional antenna is configured to transmit an uplink signal in a direction that corresponds to the orientation and receive downlink signals when positioned in the orientation; and an optimal orientation determining means for selecting one of the plurality of potential orientations as an optimal orientation based on a first comparison of a corresponding strongest serving node signal power level ascertained for each orientation of the plurality of orientations to a predefined serving node signal power threshold, and a second comparison of a corresponding strongest non-serving node signal power level ascertained for each orientation of the plurality of orientations to a predefined non-serving node signal power threshold.

16. The computerized system of claim 15,
the directional antenna control means, further for causing an electronic motor to position the directional antenna in the selected optimal orientation.

* * * * *